United States Patent [19]

Murphy

[11] 4,031,367

[45] June 21, 1977

[54] METHODS AND APPARATUS FOR PULSE HEIGHT ANALYZER OFFSET CONTROL

[75] Inventor: Richard D. Murphy, Ridgefield, Conn.

[73] Assignee: Schlumberger Technology Corporation, New York, N.Y.

[22] Filed: Mar. 31, 1975

[21] Appl. No.: 563,510

[52] U.S. Cl. .............................. 235/151.3; 250/253; 250/262; 328/116
[51] Int. Cl.² ........................................ G01V 5/00
[58] Field of Search ............... 235/151.3; 250/252, 250/262, 270, 253; 328/71, 91, 146, 147, 115, 116

[56] References Cited

UNITED STATES PATENTS

| | | | |
|---|---|---|---|
| 2,956,165 | 10/1960 | Johnson | 250/83.3 |
| 3,213,279 | 10/1965 | Caldwell | 250/83 |
| 3,226,544 | 12/1965 | Clark | 250/262 |
| 3,264,475 | 8/1966 | Reed et al. | 250/71.5 |
| 3,534,401 | 10/1970 | Karvellas et al. | 235/151.3 |
| 3,760,281 | 9/1973 | Hogg | 235/151.3 |
| 3,829,686 | 8/1974 | Schultz et al. | 250/262 |
| 3,890,501 | 6/1975 | Johnstone | 250/270 |

Primary Examiner—Malcolm A. Morrison
Assistant Examiner—Errol A. Krass

Attorney, Agent, or Firm—Brumbaugh, Graves, Donohue & Raymond

[57] ABSTRACT

A pulse circuit periodically produces test pulses of two different amplitudes which are eventually fed in appropriate time intervals to the input of a multi-channel pulse height analyzer to enable continuous monitoring and correction of the offset of the analyzer. Although the amplitudes of both pulses may drift with temperature and time, their amplitude ratio is substantially constant over a broad temperature range. The ratio of numbers, corresponding to the locations of the centroids of the two test pulse peaks in the pulse height analyzer output spectrum, is compared with a reference value of this ratio, and, if the measured ratio deviates excessively from the reference, the offset of the analyzer is adjusted in a direction such that subsequent centroid measurements and ratio comparisons yield tolerably small deviations from the reference ratio. The pulse amplitudes are modulated with noise so that output counts from the pulse height analyzer for each of the two test pulse peaks fall into several channels of the analyzer's amplitude range in order that centroids may be determined to precise fractional channel locations. In this way more precise values of the pulse amplitude ratio are possible then would be the case if noise were not added to the two pulse amplitudes. The increased precision of the ratio permits control of the pulse height analyzer offset to within narrow limits.

23 Claims, 7 Drawing Figures

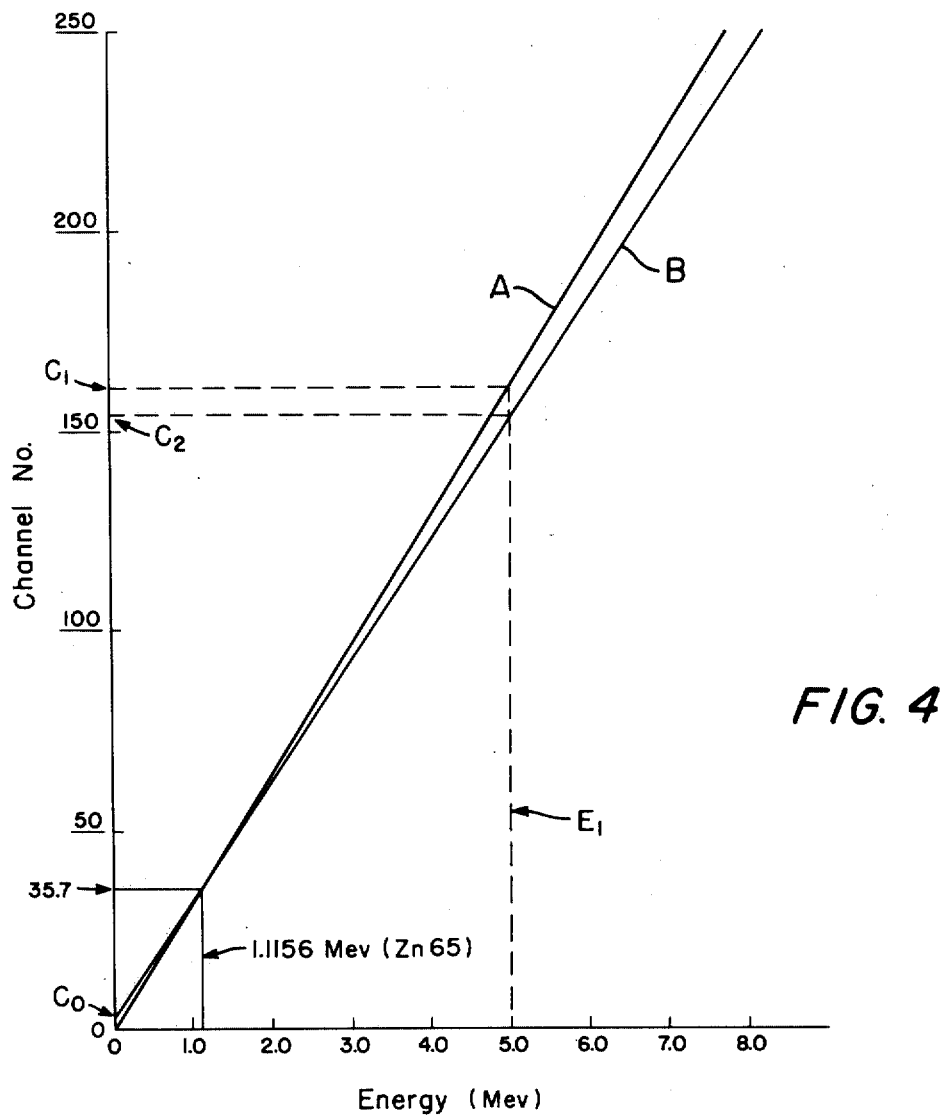
FIG. 4
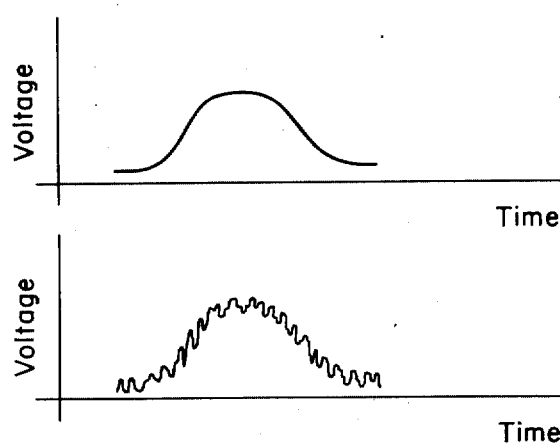
FIG. 6A
FIG. 6B

METHODS AND APPARATUS FOR PULSE HEIGHT ANALYZER OFFSET CONTROL

BACKGROUND OF THE INVENTION

1. Field of the Invention

This invention relates generally to the calibration of pulse height analyzers and pertains in particular to improved methods and apparatus for enabling the energy-channel calibration of a pulse height analyzer to be maintained over a wide temperature range.

2. The Prior Art

Of the many well logging instruments and techniques developed over the years to determine the hydrocarbon content and productivity of earth formations, the spectroscopy tool, by which energy spectra of the constituents of formation matrices and fluids are generated, has been found to provide information of particular value in formation analysis. Typically, the energy spectra are obtained by irradiating the formations of interest with pulses of high energy neutrons and detecting the gamma rays resulting from interactions of the neutrons with the formation nuclei in a way which converts each detected gamma ray into an electrical pulse whose amplitude is a measure of the gamma ray energy. These pulses are then sorted according to height in a pulse height analyzer to develop energy spectra characteristic of the constituents near the tool.

The quality of gamma ray energy spectra thus provided is of course dependent upon the stability of the energy response of the detector-analyzer system during use. This is of particular concern in well logging, where environmental conditions are severe, and especially so in tools in which the pulse height analyzer is located downhole. In such cases, instabilities in the energy calibration of the detector-analyzer system commonly result, for example, as a direct effect of changes in well bore temperature or indirectly from temperature-induced and other fluctuations in power supply voltages for the downhole electronics. Such instabilities frequently manifest themselves as variations in the pulse amplification (gain) of the detector-analyzer circuitry or in the zero offset of the linear pulse height-channel relationship of the pulse sorting circuitry of the pulse height analyzer. "Zero offset" as used hereinafter refers to the output of the analyzer for a zero energy input. These problems are particularly troublesome in spectroscopy systems intended for analysis of gamma rays of energies substantially higher than those of available natural calibration sources, i.e., where the ratio of the full scale energy of the system to the calibration energy is large, and where the resolution quality of the system does not admit of the use of induced gamma ray peaks for calibration purposes. Desirably, therefore, some provision is made in such systems for examining the response of the system during use and for compensating for any instabilities detected. Various apparatus and techniques have been proposed for this purpose in the past. These apparatus and techniques, however, have not fully responded to the requirements of the art in this regard.

One prior art technique for stabilizing a multi-channel pulse height analyzer is to enclose it in an oven which has a higher temperature than the borehole, as is described in U.S. Pat. No. 3,534,401 to Karvellas et al. Naturally this is inefficient because of the unduly large power requirements. If the pulse height analyzer has only a few channels, such as the ones shown in U.S. Pat. Nos. 3,264,475; 3,368,075 and 3,394,256 to Reed et al., only the threshold voltage of each channel need be maintained and not the gain and offset. Among other disadvantages, however, this technique is not practicable for analyzers having numerous channels. Furthermore, Reed et al. make no provision for detecting and compensating for changes in the operating characteristics of circuit components due to temperature gradients within the borehole.

SUMMARY OF THE INVENTION

A general object of the invention, therefore, is to provide improved methods and apparatus useful in maintaining the energy response calibration of a pulse height analyzer over a broad temperature range.

A further object of the invention is to provide methods and apparatus for automatically detecting and compensating for offsets in the energy-channel relationship of a pulse height analyzer.

More specifically, it is a further object of the invention to provide well logging methods and apparatus for repeatedly monitoring the energy-channel response of a pulse height analyzer during a logging run and for automatically compensating for a deviation of the zero offset from a calibration value.

The foregoing and other objects are attained in accordance with the invention by generating two test pulses of different amplitudes in such a manner that the ratio of the test pulse amplitudes is maintained substantially stable over a broad temperature range. Illustratively, this is accomplished by generating a first pulse of relatively large amplitude and thereafter attenuating the large amplitude pulse by a predetermined factor to produce a second pulse of relatively low amplitude. The temperature characteristics of the attenuator component used to produce the second pulse are selected so as to be substantially independent of temperature over the temperature range of interest. The high and low amplitude pulses are selectively coupled to a buffer amplifier (having very low offset temperature coefficient characteristics) which additionally shapes them into test pulses of appropriate form for application to a pulse height analyzer. Upon receipt by the analyzer, the test pulses are sorted in the usual manner according to their amplitudes. By determining the channel locations of the peaks corresponding to the two test pulses, preferably by computing the centroids of the peaks, a ratio of the respective channel locations may be developed and compared with the amplitude ratio of the test pulses for the desired condition of zero offset of the pulse height analyzer energy-channel relationship, e.g. no offset. A difference between the channel locations ratio and the test pulse amplitude ratio is indicative of an erroneous offset in the energy-channel relationship of the pulse height analyzer. A control signal representative of any such difference is generated and utilized to adjust the analyzer offset by the amount and in the direction required to bring the two ratios into substantial agreement. When this is achieved, any offset in the energy-channel relationship will be within tolerable limits of the calibration value.

To enable more accurate computation of the centroids of the test pulse peaks, a noise signal having a substantially zero DC component is superimposed on the respective high and low amplitude pulses. This has the effect of distributing the amplitudes of successive test pulses into a small group of channels around that channel into which all of the pulses would fall in the absence of noise. Preferably, the magnitude of the noise signal is variable so as to allow for control of the spread imparted to the peaks and to, thereby, insure that the peaks will embrace a sufficient number of channels to enable accurate computation of the centroids.

This in turn affords enhanced accuracy both in the determination of the magnitude of any difference between the measured centroid ratio and the test pulse amplitude reference ratio and in the correction of the corresponding offset. To avoid applying noise continuously to the pulse height analyzer, the first and second pulses and the noise signal are preferably generated in response to the same command signal, with a suitable time delay interposed between initiation of the noise signal and the generation of the first and second pulses.

Advantageously, the high amplitude test pulses and the low amplitude test pulses are developed as trains of pulses of one or the other amplitude. To that end, a switching circuit of appropriate temperature-independence is provided which alternately passes high or low amplitude pulses to the buffer amplifier, the switching interval being considerably greater than the pulse separation interval. Hence within each time period allocated to offset correction, a succession of high amplitude pulses or a succession of low amplitude pulses, or both, will be fed to the pulse height analyzer, depending upon the frequency and phasing of the amplitude switching circuit relative to the pulse generating command signal.

In well logging systems, particularly those in which the pulse height analyzer is located downhole, the foregoing offset monitoring and compensating steps are preferably carried out repetitively during the course of a logging run. Suitably, therefore, the command signals calling for the generation of the test pulses are provided during an appropriate interval of each overall operating cycle of the logging system. The outputs of the pulse height analyzer corresponding to the high and low amplitude test pulses are processed in the aforementioned manner to determine their centroids, the centroid ratio is formed and compared with the reference value of the test pulse amplitude ratio and the required control signal is developed to maintain the offset of the analyzer within limits. Accordingly, any offsets which may be developed in the energy-channel relationship of the analyzer, which if uncorrected might lead to distortion of the spectra provided by the logging system, will be promptly and automatically detected and compensated for. Further, the test pulse amplitude ratio should normally be selected such that the high amplitude pulse will correspond to a channel location near the upper end of the energy scale of the tool and the low amplitude pulse will correspond to a channel location near the lower end of the energy scale, thereby ensuring a ratio sensitive to offset.

BRIEF DESCRIPTION OF THE DRAWINGS

Further objects and advantages of the invention will be apparent from the following detailed description and drawings in which:

FIG. 4 is a graph showing the effect of offset on channel assignment;

FIGS. 6A and 6B are graphs of a pulse output from the circuit of FIG. 5.

DETAILED DESCRIPTION

As mentioned, the present invention affords improved apparatus for automatically monitoring and maintaining the energy-channel calibration of a pulse height analyzer over a broad range of operating temperatures. It therefore has particular utility in well logging applications, and a representative embodiment of the invention is described and illustrated herein in that environment. It will be understood, however, that this is merely illustrative of but one of the various applications for which the invention is suitable.

Figure 1:
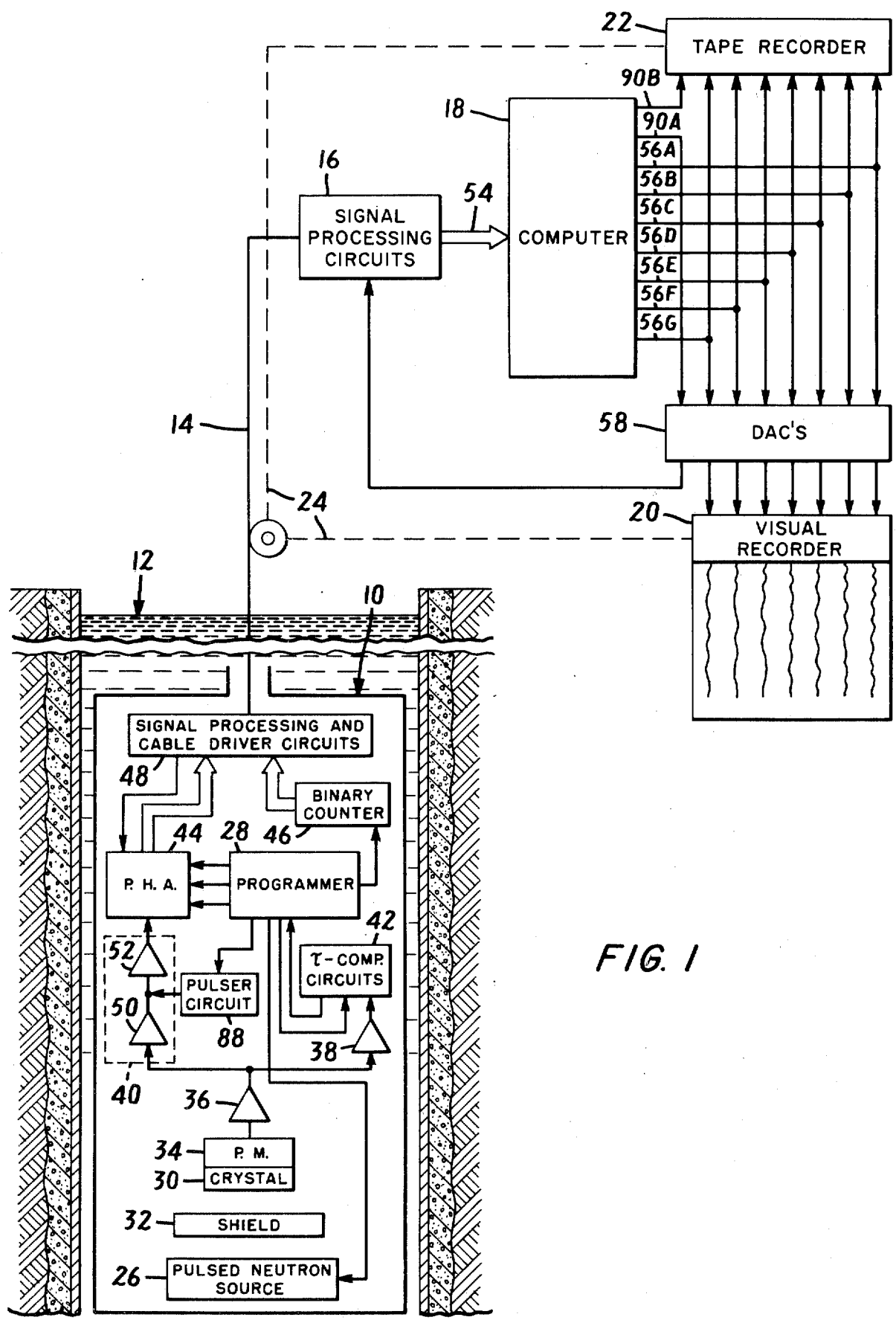
FIG. 1 is a block diagram of a well logging tool employing the invention.

FIG. 1 illustrates a spectroscopy logging tool 10 suspended in a borehole 12 by an armored cable 14. Suitably, the tool 10 is of the combined thermal neutron decay time-spectroscopy type disclosed in copending, commonly-owned United States patent application Ser. No. 563,359, now abandoned filed Mar. 31, 1975 by Stephen Antkiw for "Neutron Characteristic and Spectroscopy Logging Methods and Apparatus." The cable 14 also provides electrical connection between the tool 10 and the uphole electronics, which include signal processing circuits 16, a computer 18, a visual recorder 20, a magnetic tape recorder 22 and additional intermediate signal processing circuits (described hereinafter). Computer 18 suitably is a general purpose digital computer, such as that manufactured by Digital Equipment Corporation, Maynard, Massachusetts, under the designation PDP-11. The recorders 20 and 22 are coupled to the cable 14 by the usual mechanical linkage 24 for making the customary records of the logged values as a function of tool depth. Appropriate power supplies (not shown) are provided at the surface and in the well tool for supplying power to the uphole and downhole electronics.

As described in the aforementioned application Ser. No. 563,359, now abandoned, the pertinent portions of which are hereby incorporated herein, the tool 10 includes a pulsed neutron source 26 which, under the control of a programmer 28, emits successive pulses or bursts of 14 Mev neutrons into the formations surrounding the borehole 12. Gamma radiation resulting from interactions between the neutrons and formation nuclei, e.g., thermal neutron capture gamma rays, is detected by a scintillation crystal 30. The usual shield 32 is interposed between the crystal and the neutron source. The crystal 30 is optically coupled to a photomultiplier tube 34 which, in response to a detected gamma ray, generates a pulse signal whose amplitude is representative of the energy of the gamma ray. Output pulses from the photomultiplier 34 are passed by a follower buffer amplifier 36 and, after appropriate amplification in amplifier 38 and linear amplifier 40, are fed to the thermal neutron decay time ($\tau$) computation circuits 42 and the pulse height analyzer 44, respectively, of the wall tool 10, as is fully described in the referenced portions of the aforementioned Antkiw application Ser. No. 563,359 now abandoned.

The specific construction of the $\tau$-computation circuits 42 may be in accordance with the teachings of Frentrop et al. U.S. Pat. No. 3,662,179. Their operation in the combined $\tau$-spectroscopy tool of FIG. 1 is described in detail in Antkiw application Ser. No 563,359, now abandoned, and need not be repeated in full here except by reference. Briefly, the circuits 42 include gating, counting, comparator and oscillator circuits which are responsive to amplified pulses from the photomultiplier 34 during programmer-controlled measurement intervals to derive, in conjunction with the programmer 28, a measurement of $\tau$, $\Sigma$, or another selected neutron characteristic of the formations under investigation. An output representative of the measured value, illustratively $\Sigma$, is developed in a binary counter 46 and applied to signal processing and cable driver circuits 48 for transmission to the surface.

The linear amplifier 40 comprises three-stages, a first-stage diffro:integrator 50 and a second-stage and third-stage integrator (with amplification) 52. Under control of the programmer 28, by virtue of gating and discriminator level control signals transmitted therefrom to the pulse height analyzer 44 in accordance with Antkiw's teachings, the pulse outputs of amplifier 40 are applied to the pulse height analyzer 44 for measurement of the amplitude of the pulses and the consequent assignment thereof to particular channels according to their height. Pulse height analyzer 44 may be of any construction appropriate to that purpose. For example, it may be of the single-ramp (Wilkinson run-down) type or of the successive-approximation type. After each pulse is assigned a channel according to energy, the count-per-channel information thus developed is applied to circuits 48 for transmission uphole.

The signal processing and cable driver circuits 48 may be of an appropriate construction for time-division multiplexing, encoding and otherwise assembling the data-bearing signals from the binary counter 46 and the pulse height analyzer 44 into a suitable waveform and for impressing the latter on the cable 14 for transmission to the surface interface circuits 16, and the specific forms of the circuits employed for these purposes do not characterize the invention. For example, the circuits may be constructed generally in accordance with the teachings disclosed in copending, commonly-owned U.S. patent application Ser. No. 563,507, filed Mar. 31, 1975 by W. B. Nelligan for, "System For Telemetering Well Logging Data."

At the surface, the data-bearing signals from the binary counter 46 and from the pulse height analyzer 44 are amplified, decoded and otherwise processed in the signal processing circuits 16 for coupling over a conductor bundle 54 to the computer 18. The computer develops values of one or both of $\Sigma$ and $\tau$ and of selected spectroscopy outputs, as described in the aforementioned Antkiw application Ser. No. 563,359 now abandoned. Digital representations of the $\Sigma$, $\tau$ and spectroscopy outputs are transmitted over conductors 56A–56G to the tape recorder 22 and, through appropriate digital-to-analog converter (DAC) circuits 58, to the visual recorder 20. In accordance with the present invention, the computer 18 is also employed in controlling the offset of the pulse height analyzer, as is described hereinafter.

Figure 2:
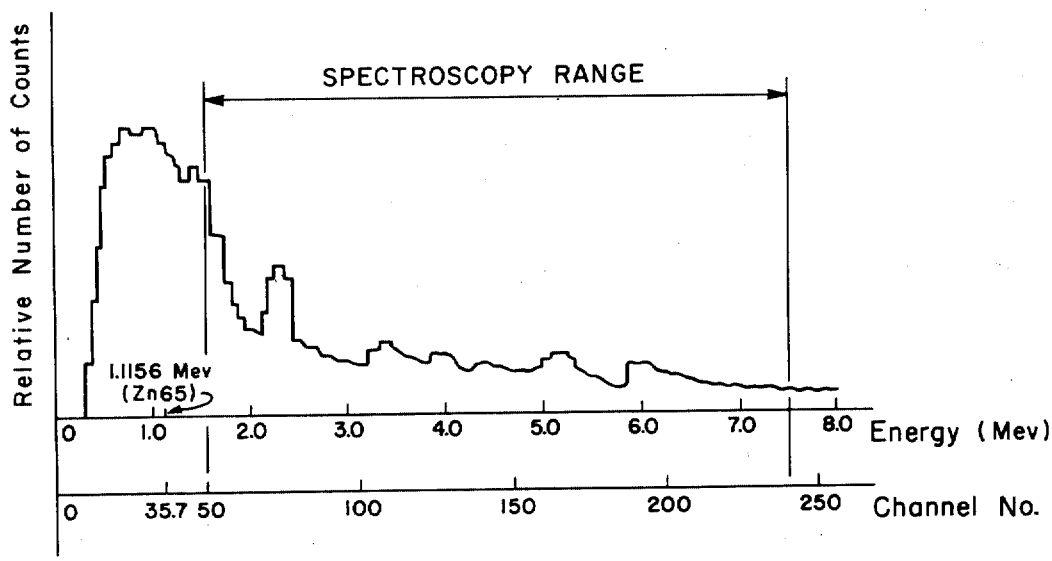
FIG. 2 is a graph of a typical energy spectrum.

Generally, the number of channels, channel width, energy discrimination levels and other characteristics of the pulse height analyzer 44 will be selected in accordance with the requirements of the analysis to be performed. For the purpose of developing thermal neutron capture gamma spectra in accordance with the teachings of Antkiw application Ser. No. 563,359 now abandoned, for example, the portion of the capture gamma spectrum which is to be analyzed might extend from 1.5 Mev to 7.5 Mev. The number of channels used over the energy range of interest is of course dependent upon the desired precision of analysis and the resolution capabilities of the detector crystal 30. For instance, with a thallium-activated sodium iodide crystal, on the order of 200 channels over the energy range of 1.5 Mev to 7.5 Mev has been found suitable. A typical gamma ray spectrum produced under these conditions might appear as depicted in FIG. 2, wherein the distribution of gamma ray intensities (relative count rates) over the energy range of interest (1.5–7.5 Mev) is shown with respect to gamma ray energy and with respect to the corresponding channels (49–240). Other energy ranges or energy-to-channel distributions may be course be used.

Figure 3:
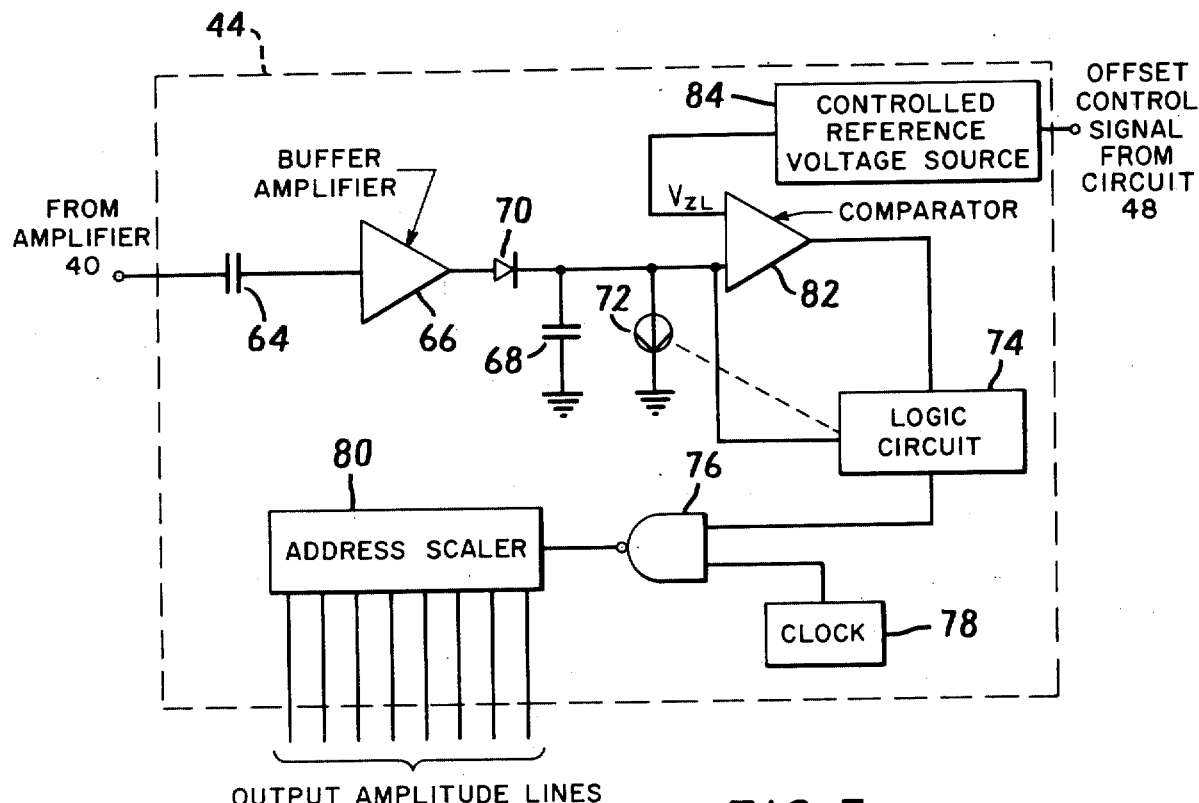
FIG. 3 is a schematic of a pulse height analyzer useful with the present invention.

Turning now with more particularity to the details of the invention, FIG. 3 illustrates a conventional single-ramp (Wilkinson) type pulse height analyzer useful in developing gamma ray energy spectra of the nature depicted in FIG. 2. Upon application to the pulse height analyzer 44, each output pulse from amplifier 40 of FIG. 1 is initially coupled through a capacitor 64 to an input buffer amplifier 66, and the resulting output pulse is utilized to charge a capacitor 68 through a diode 70. The voltage on capacitor 68 therefore follows the buffer input voltage as long as the pulse is rising. When the pulse peaks, the capacitor holds the peak value of the pulse amplitude until constant current source 72 is switched on by logic circuit 74, which includes a standard peak sensing circuit such as that described, for example, in the Instruction Manual for the Northern Scientific, Inc. 8192 analog-to-digital converter. The logic circuit determines that the current source 72 should be turned on when the voltage on the capacitor 68 remains constant for a period of time, say 50 nsec, and is above a certain minimum value, whereupon the voltage on capacitor 68 begins to discharge linearly. At the same time, logic circuit 74 sends a signal to one input of NAND gate 76. The other input of NAND gate 76 is connected to a free-running clock 78. Therfore, at the same time that the constant current source 72 is switched to the "on" state, NAND gate 76 is rendered operative to pass clock pulses to an address scaler or counter circuit 80.

The voltage across capacitor 68 is also applied to one input of a comparator circuit 82, the other input of which is connected to a reference voltage $V_{ZL}$ from a controlled voltage source 84. The value of the reference voltage $V_{ZL}$ is determined by the magnitude of the offset control signal, the generation of which is described hereinafter. When the voltage across the capacitor 68 reaches a value equal to the reference voltage $V_{ZL}$, a signal is sent to the logic circuit 74 which causes it to close NAND gate 76 and thereby prevent additional clock pulses from reaching the address scaler 80. This leaves address scaler 80 with a digital count which is proportinal to the time it takes the constant current source 72 to reduce the voltage across capacitor 68 to the reference voltage level and, hence, to the pulse height above $V_{ZL}$ of the input pulse to amplifir 66. Thus the scaler output is a digital measure of the energy of the gamma ray giving rise to the output and is assigned accordingly, by means of a count or tally, to a predetermined location (channel) within signal processing circuits 48.

Proper energy-to-channel correlation in this manner assumes, of course, that the detector-analyzer system always operates in accordance with a calibrated characteristic curve relating gamma ray energy and channel number. As noted above, however, calibration is difficult to maintain over the course of a logging run, as drift of the energy-response characteristic of the system frequently occurs as a result of direct or indirect temperature effects on the crystal-photomultiplier-amplifier-analyzer gains and on the zero offset of the analyzer. The a.c. coupling to the analyzer, however, makes its offset significant only in relation to $V_{ZL}$. Gain and offset control are therefore essential to the production of accurate spectra in severe thermal environments.

Gain calibration may be controlled by use of a natural gamma ray emitter mounted in close proximity to the crystal 30. To avoid tying up the pulse height analyzer during its normal spectroscopy functions, the emitter preferably has a peak energy lower than the formation gamma energy range to be analyzed. Illustratively, a zinc 65 source, having a 1.1156 Mev gamma, might be used in the tool described herein. This energy is assigned to a specific channel location, e.g. channel 35.7 as illustrated in FIGS. 2 and 4. The gain of the detector-analyzer circuitry during operation may then be checked for accuracy by determining whether the system is adhering to the specified energy-channel relationship established for the zinc 65 peak. One way in which this may be done is by counting the number of zinc 65 pulses falling within a particular number of channels (energy band) on either side of the channel location assigned to the 1.1156 Mev peak and comparing the respective counts with one another. If one total count is greater than the other, an error signal of appropriate magnitude and polarity is generated to adjust the voltage of the power supply (not shown) for the photomultiplier 34 so as to re-establish the 1.1156 Mev peak at the specified channel location. This procedure corrects for gain variations anywhere in the detector-analyzer system. Downhole circuits for performing gain control functions in this way are described in U.S. Pat. No. 2,956,165, granted on Oct. 11, 1960 to F. F. Johnson and assigned to the assignee of this application, and the pertinent portions of that patent are hereby incorporated into this application.

Alternatively, the counting and comparing steps could be carried out uphole by the computer 18. Upon completion of the comparing step, the computer would output a digital repesentaion of the required error signal, and this output would be applied to an appropriate DAC circuit (not shown) for generation of an analog signal for transmission downhole to the photomultiplier power supply control circuit.

Where the location of the calibration peak must be known with great accuracy, e.g. to within a fraction of a channel, it is preferable to compute the centroid of the peak rather than to employ the foregoing count-comparison technique. By computing the centroid, it will be understood that the following computation is intended: after appropriately subtracting any existing background spectrum from the total spectrum of calibration peaks plus background, the centroid channel number = (counts per channel × channels number)-/sum of all counts contained in the calibration peak of interest. This approach is favored (so as to attain the necessary accuracy), for example, when gamma rays of comparatively high energy (relative to that of the gain calibration source) are to be analyzed, as is described in more detail hereinafter. Accordingly, the computer 18 could be arranged to compute the centroid of the zinc 65 peak in terms of its channel location from counts representing a small range of gamma ray energies spanning the peak, either with or without subtraction of background to emphasize the peak, and thereafter to compare the computed value with the assigned value, e.g. 35.7. If a discrepancy exists, an appropriate analog error signal could be developed in the aforementioned manner to restore the prescribed 1.1156 Mev - channel 35.7 correspondence.

To achieve effective gain control, however, the offset of the pulse height analyzer must also be controlled. Moreover, should a drift in offset develop, the desired energy-channel relationship will not exist even if the gain should happen to be momentarily correct. The nature of the error in the energy-channel relationship introduced by an improper offset is illustrated in FIG. 4.

Curve A represents the channel-energy response of the detector-analyzer system when both gain and offset are properly controlled, i.e., when the system is in calibration. Hence in the example portrayed, curve A passes through the intercept of the zinc 65 peak (1.1156 Mev) and its associated channel location (35.7) and through the bottom edge of channel O. It will be appreciated that any suitable channel location may be selected to correspond to zero energy. If, while the gain remains stable, an offset develops in the pulse height analyzer, due to temperature effects or the like, the channel-energy response of the system might instead follow the relationship represented by curve B in FIG. 4. In this instance, the zinc 65 peak is properly assigned but all other pulses are erroneously sorted because of the offset of the zero energy location from the bottom of channel O to some other channel location $C_0$ (shown exaggerated in FIG. 4 for clarity). For example, gamma rays of energy $E_1$, correctly associated with channel $C_1$, would instead be assigned to channel $C_2$. The effect of such an offset is particularly significant where the energy of the gamma emitter used for calibration purposes is low relative to the full scale energy value, as is normally the case when comparatively high energy gamma rays are to be detected, since most, if not all, natural gamma emitters having peak energies above 2.0 Mev are not suitable for downhole use as calibration sources. It may readily be seen from FIG. 4, for instance, that any offset at zero energy is magnified by a factor of seven at 8.0 Mev, so that a seemingly small offset could lead to an intolerably large error at higher energy levels. It is necessary, therefore, not only to detect and compensate for any erroneous offset in the zero-energy/zero-channel relationship, but to do so to a high degree of accuracy, with the object of maintaining any such error as close to zero as possible. For well logging applications, it is further important that a capability exist for implementing such detection and compensation repeatedly during the course of a logging run and at changing elevated temperatures.

In furtherance of these objects, the present invention provides apparatus for generating test pulses of a nature useful in enabling precise offset control in spectroscopy circuits. Such apparatus includes a pulse circuit 88 (see FIG. 1) which is arranged to couple test pulses to the pulse height analyzer through the second and third stages 52 of linear amplifier 40. The first stage 50 of amplifier 40 blocks the test pulses from interfering with the operation of the $\tau$-computation circuits 42. In general, the pulser circuit, under the control of the programmer 28 as described below, alternately generates low amplitude pulses having a voltage equivalent to a gamma ray energy from the low end of the range of interest and high amplitude pulses having a voltage equivalent to a gamma ray energy from the high end of the range. The amplitudes of the low and high pulses may vary, but the pulser circuit is so constructed as to maintain their ratio substantially stable over a broad temperature range, e.g., up to above 100° C. The high/low amplitude ratio may take any appropriate value and suitably may be nominally 3.5:1.

Generation and transmission of the test pulses to the analyzer 44 may be phased in any convenient manner with respect to the normal spectroscopy duty cycle of the tool and the application to the analyzer of the zinc 65 pulses. By way of example and in accordance with Antkiw application Ser. No. 563,359, now abandoned, the zinc 65 and offset test pulses preferably are analyzed by the pulse height analyzer during a specific time period, designated the "stabilization" period, occurring within each operating cycle of the tool, with the pulses for gain correction (zinc 65 pulses) and for offset correction (test pulses) being analyzed in alternate stabilization periods. Programmer 28 of the tool (see FIG. 1) controls the sequence of events in the operating cycle of the tool by transmitting appropriate control signals to the pulse height analyzer and to the pulser circuit 88. The manner in which the programmer controls the operation of the pulse height analyzer is described in detail in the aforementioned Antkiw application.

Considering now the operation of the pulser circuit, the programmer transmits signals to the pulser commanding it to generate test pulses. Whether the pulses produced are of high amplitude or low amplitude is determined by a clock-driven switching circuit within the pulser circuit 88. Preferably, the frequency of generation of the pulses is comparatively high relative to the switching frequency, so that a succession or train of pulses of like amplitude will be generated during each stabilization period. For example, the command signals might be generated at a rate of 750 or more per second while switching between pulse amplitudes is carried out on the order of once per second. Also, the last command signal within each stabilization period preferably is transmitted far enough in advance of the end of the period that an integral number of complete test pulses is coupled to the pulse height analyzer, thereby avoiding analysis of partial pulses.

Upon receipt of the pulses from the pulser circuit 88, pulse height analyzer 44 sorts each pulse according to its amplitude in the usual manner. Since, in time intervals that are short relative to the intervals between offset corrections, the analyzer imparts equal offsets to each test pulse, regardless of amplitude, the ratio of centroid channel numbers defining the locations of the upper and lower amplitude test peaks departs, in general, from the actual pulse amplitude or reference ratio in a well defined manner for a given analyzer offset. A control signal can be generated and fed back to the analyzer to reduce the analyzer offset to within acceptable limits should the difference in ratios exceed some corresponding limit. To that end, the counts-per-channel data generated by pulse height analyzer 44 are sent uphole to the computer 18, which computes the peak centroids according to the method described above. The computer then forms the ratio of the centroids for the high and low amplitude pulses, compares it with the reference pulse ratio; e.g., 3.5:1, and outputs a digital signal representative of the state of agreement of the computed ratio with the reference ratio. This signal is applied over a conductor 90A to a DAC circuit (see FIG. 1) for conversion in conventional fashion to an analog control signal of appropriate polarity and magnitude, which is then fed to the signal processing circuits 16 and sent downhole for correction of the offset productive of the disparity between the two ratios. Conveniently, this is accomplished by applying the analog control signal to the pulse height analyzer (see FIG. 3) in a manner to adjust the $V_{ZL}$ reference voltage to the comparator circuit 82 in the direction and by the amount necessary to bring the computed centroid ratio into substantial agreement with the reference ratio established by the pulser circuit 88. Any offset in the zero-energy/zero-channel relationship of the pulse height analyzer from the calibrated value is thereby automatically detected and compensated for throughout the course of a logging run. If desired, the computed values of the pulse peak centroids and the centroid ratio may also be logged, as indicated by the conductor 90B leading to tape recorder 22.

Figure 5:
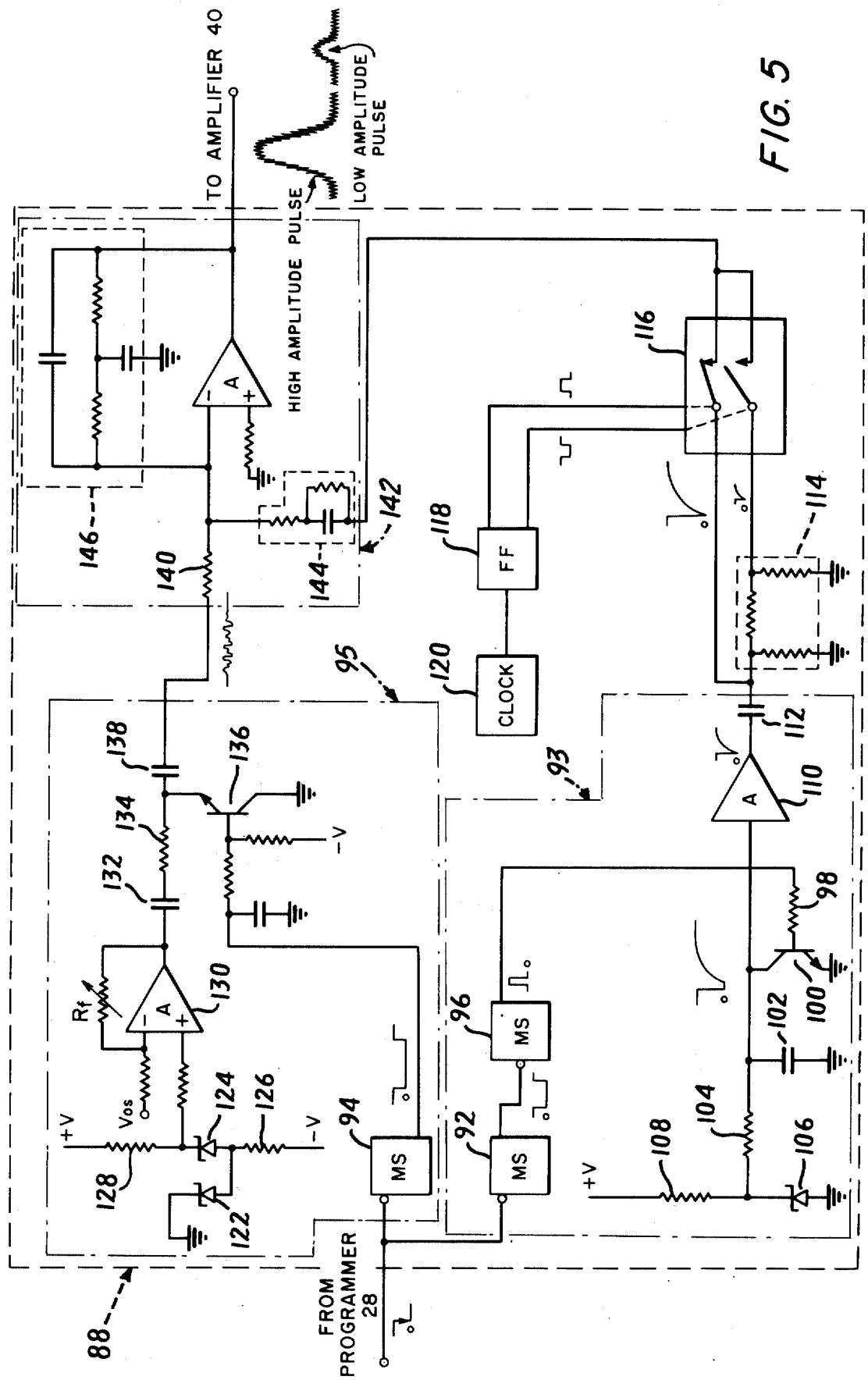
FIG. 5 is a schematic of a pulser circuit useful in practicing the present invention.

One embodiment of the pulser circuit 88 adapted to produce test pulses of the type and for the purpose described is illustrated in FIG. 5. Within the circuit, the negative-going edge of each command signal from the programmer 28 simultaneously energizes two monostable multivibrators 92 and 94, the former being included in a pulse generating circuit 93 and the latter in a noise generating circuit 95. The trailing edge of the delay pulse from monostable 92 triggers a second monostable multivibrator 96 to output a narrow pulse (e.g., 50 to 100 nsec duration) which is coupled through a resistor 98 to provide base current control of a transistor 100. Transistor 100 is thereby rendered conductive for the duration of the current pulse, causing it to discharge the capacitor 102. After transistor switch 100 opens, capacitor 102 charges through resistor 104 to the voltage determined by the voltage reference element 106, resistor 108, and V+. Capacitor 102 is recharged in accordance with the time constant of the RC circuit. Suitably, the value of the time constant is of the order of 50 $\mu$s or less, depending upon the frequency of transmission of "generate-pulse" command signals from programmer 28.

By virtue of this construction, an exponential voltage waveform is produced on capacitor 102. This pulse is applied to a buffer amplifier 110 and thereafter through a blocking capacitor 112 to a voltage divider network 114 and to one input tap of an analog switch 116, for use in developing the high amplitude test pulse for offset control. It will be understood that the usual biasing, filtering and bypassing circuits are provided in connection with amplifier 110 and with all of the other amplifiers depicted in FIG. 5 as well. Since they comprise well known conventional components, these circuits are not depicted in the drawing in the interest of clarity. Amplifier 110 is preferably of the fast FET-input type, having a high input impedance to prevent loading of the capacitor 102 and a very low output impedance relative to the divider impedance level. Capacitor 102 itself should have very small leakage characteristics over the design temperature range. The effect of any drift in the offset of amplifier 110 on its output is removed by capacitor 112.

The purpose of voltage divider network 114 is to attenuate the high amplitude output pulse from amplifier 110 to the extent required to produce the desired low amplitude pulse. Thus if the test amplitude ratio is to be 3.5:1, for example, the resistors of the network would be selected to attenuate the pulse from amplifier 110 by a factor of 3.5. The low amplitude pulse resulting from this attenuation is applied to an input tap of analog switch 116. The switch 116, therefore, receives pulses whose amplitudes track one another in a manner which preserves a fixed amplitude ratio. In accordance with the invention, this ratio is maintained substantially constant to the required degree of accuracy over the temperature range of interest, e.g. up to and above 100° C. Suitably, therefore, network 114 comprises an ultra-stable resistive divider network. Such networks are available, for example, from Vishay Resistor Products, Inc., Malvern, Pa.

Analog switch 116 should likewise be highly temperature independent and, in addition, should have low ON resistance compared with the impedance level of voltage divider network 114. The operation of switch 116 is controlled by a flip-flop 118 which is driven by a free running clock 120 so as to change state upon receipt of each clock pulse. In one state, flip-flop 118 energizes switch 116 to pass high amplitude pulses from amplifier 110 (as shown in FIG. 5) and, in its other state, to pass low amplitude pulses from voltage divider network 114. The frequency of clock 120 preferably is relatively low compared to the rate of transmission of "generate-pulse" command signals from programmer 28, as mentioned heretofore. In this way, a comparatively large number of pulses of either high or low amplitude will be generated in succession, thereby enabling sufficient pulses of the same amplitude to be coupled to the pulse height analyzer during a stabilization period to provide an adequate definition of the centroid location for offset determination and control.

Where the line widths of the peaks corresponding to the test pulses are broad enough to enable determination of the locations of the peaks with sufficient accuracy, the pulses passed by analog switch 116, after appropriate shaping as described hereinafter, may be applied to amplifier 40 for introduction to pulse height analyzer 44. In many instances, however, the line widths will be too narrow for this purpose. It is a further feature of the invention, therefore, that, where necessary, noise is added to the pulses passed by the switch 116 to modulate the amplitudes of the pulses and thus broaden or spread the peaks. The amount of noise required in any particular system depends upon the width of the channels of the pulse height analyzer. Generally, the peaks should be of sufficient width to span enough channels to enable accurate computation of their centroids. This requires acquisition of a sufficient number of counts to give a good statistical reliability in the channels spanning the peak. Illustratively, the individual peaks might span on the order of two to four channels.

An exemplary embodiment of a noise generating circuit constructed in accordance with the invention is depicted at 95 in FIG. 5. Circuit 95 generally comprises a switched noise source which produces a comparatively low level noise signal having a substantially zero d.c. component and which provides on-off switching control in a manner not productive of a d.c. pedestal. Specifically, it includes noise diodes 122 and 124 which are coupled through biasing resistors 126 and 128 to opposite potential sources (not shown). The noise diodes, biasing resistors and potential sources, and the gain of noise amplifier 130, are selected to provide the desired noise signal level, and preferably are configured such tha the d.c. level at the output of amplifier 130 (which is under control of the voltage $V_{os}$) minimizes the leakage of capacitor 132.

In the absence of a "generate-pulse" command signal from the programmer 28, the noise signal passed by capacitor 132 is normally shorted to ground through a switching network including a resistor 134 and a transistor 136, thereby preventing the continuous application of a noise signal to the pulse height analyzer 44. Thus to make the noise signal available for combining with the pulses from analog switch 116, it is necessary to turn transistor 136 off for an appropriate time interval. Ideally this is done in a way which does not give rise to a d.c. pedestal. To that end, transistor 136 is arranged in the inverted configuration in order to achieve a low offset voltage in the saturated state (low ON resistance) and thus enable switching to be accomplished with minimum pedestal.

Switching of the transistor 136 is synchronized with the operation of pulse generating circuit 93 by applying the output pulse from monostable multivibrator 94 to the transistor base, thereby rendering it nonconductive throughout the duration of the monostable output pulse. This results in the noise signal from amplifier 130 being a.c. coupled through a blocking capacitor 138 to a summing resistor 140 of an operational amplifier circuit 142. The delay introduced by monostable 92 in the generation of the trigger pulse output of monostable 96 of pulse generating circuit 93 allows the noise signal to be applied to amplifier 142 in advance of the generation of a test pulse.

Pulses from analog switch 116 are coupled through a filter network 144 and are summed in amplifier 142 with the noise signal from amplifier 130, thus generating a noise modulated pulse of either high or low amplitude (depending upon the state of analog switch 116) for application to the pulse height analyzer.

Considering amplifier 142 in more detail, its filter networks 144 and 146 preferably are designed with RC time constants which suitably shape the pulses from the pulse generating circuit 93 for later amplification. When the constants are properly chosen, the negative going exponential voltage pulse passed by capacitor 112 will be converted into an approximately Gaussian-shaped pulse such as those depicted in FIGS. 6A and 6B, which approximate the output of amplifier 50 (FIG. 1) when a gamma ray is received by the tool. FIG. 6A represents the shape of the pulses that would be developed by amplifier 142 in the absence of a noise signal and FIG. 6B represents the shape of the pulses with the noise signal added. It will be understood in this connection that if the addition of noise to the pulses from analog switch 116 is not required, an operational amplifier of the nature of amplifier 142 would be employed to shape the pulses prior to their transmission to amplifier 40. In effect, the trailing edge time constant of the pulse across capacitor 102 may be shortened, if necessary, by network 144 and the sharp leading edge of the pulse is rounded off by the filter network 146.

Amplifier 142 must also be capable of substantially temperature-independent performance over the design range of operative temperatures. It therefore should have a very low temperature coefficient of offset voltage and current and should be relatively fast. An appropriate exemplary construction of the amplifier A of the operational amplifier 142 is illustrated and described at pages 387-395 of "Nuclear Instruments and Methods", Volume 96, 1971, which are hereby incorporated into this specification. If desired, the offset characteristics of that amplifier may be further improved by using a single chip monolithic dual transistor in place of the transistor pair presently illustrated in the second stage of the amplifier.

Although the invention has been described and illustrated with reference to a specific embodiment thereof, it will be understood by those skilled in the art that various modifications and variations of that embodiment may be made without departing from the inventive concepts disclosed. Accordingly, all such modifications and variations are intended to be included within the spirit and scope of the appended claims.

I claim:

1. Apparatus for generating test pulses useful in controlling offsets in the analog input/digital output relationship of a pulse height analyzer over a certain temperature range, comprising:
   switching circuit means responsive to a command signal for generating a first pulse;
   means coupled to the switching circuit means for attenuating the first pulse by a predetermined factor which is substantially constant over said temperature range to produce a second pulse;
   means coupled to the switching circuit means and to the pulse attenuating means for passing the first and second pulses in a predetermined sequence; and
   impedance buffer means, having substantially stable temperature offset characteristics over said certain temperature range, for converting the first and second pulses passed by the pulse passing means into first and second test pulses of a predetermined shape for application to a pulse height analyzer, whereby the amplitude ratio of the first and second test pulses produced by the buffer means is substantially stable over said temperature range.

2. Apparatus as claimed in claim 1 wherein said first and second pulses have a sharp leading edge and an exponential trailing edge and said impedance buffer means converts the sharp leading edges into exponential edges substantially the same as the trailing edge, thereby creating Gaussian-like pulses.

3. The apparatus of claim 1 further comprising:
   means responsive to said command signal for generating a noise signal having a substantially zero d.c. component; and
   the buffer means includes means for superimposing the noise signal on the pulses passed by the pulse selecting means.

4. The apparatus of claim 3 wherein the noise signal generating means comprises means for varying the magnitude of the noise signal.

5. The apparatus of claim 3 wherein the switching circuit means comprises means for delaying the generation of the first pulse following receipt of a command signal until after generation of the noise signal has been initiated.

6. The apparatus of claim 5 wherein the noise signal generating means includes:
   means for producing a noise signal;
   switching means for normally blocking transmission of said noise signal to the buffer means and, upon the application thereto of a switching signal, for passing the noise signal to the buffer means without generating substantially any d.c. pedestal; and
   means responsive to the command signal for generating the switching signal.

7. The apparatus of claim 1 wherein the pulse attenuating means comprises an ultra-stable resistive divider network.

8. The apparatus of claim 1 wherein:
   the switching circuit means comprises means for generating the first pulse as a negative going pulse with an exponential trailing edge; and
   the buffer means comprises means for converting the negative going first and second pulses to positive fast substantially Gaussian-shaped test pulses.

9. The apparatus of claim 1 wherein the pulse selecting means comprises switching means for alternately connecting the switching circuit means and the pulse attenuating means to the buffer means.

10. The apparatus of claim 9 wherein the pulse selecting means alternately connects the switching circuit means and the pulse attenuating means to the buffer means at a rate slower than the frequency of transmission of command signals to the switching circuit means, whereby the pulse selecting means alternatively passes a succession of first pulses and a succession of second pulses to the buffer means.

11. In a well logging system of the type including a radiation detector which generates electrical pulses having amplitudes representative of the energies of radiations incident thereon and a pulse height analyzer for sorting the detector pulses into a plurality of channels according to the energies of the corresponding radiations, apparatus for controlling offsets in the energy-channel relationship of the pulse height analyzer over a certain temperature range, comprising:
   means for generating a command signal;
   means responsive to the command signal for generating a first test pulse and a second test pulse of lower amplitude than the first in a manner such that the ratio of the amplitudes of the first and second test pulses is maintained substantially constant over said temperature range;
   means for applying the first and second test pulses to the pulse height analyzer;
   means for determining the respective channel locations to which the first and second test pulses are assigned by the pulse height analyzer;
   means for forming the ratio of the respective channel locations;
   means for comparing the channel locations ratio and the ratio of the test pulse amplitudes and for generating an offset control signal representative of the difference therebetween; and
   means responsive to said offset control signal for adjusting the energy-channel offset of the pulse height analyzer in a manner to bring the channel locations ratio and the test pulse amplitude ratio into substantial agreement.

12. The apparatus of claim 11 wherein:
   the command signal generating means repetitively generates command signals at a predetermined frequency; and
   the pulse generating means includes means for alternately selecting between first test pulses and second test pulses for application to the pulse height analyzer, the frequency of said alternate selection being less than the frequency of generation of command signals, whereby the pulse generating means alternately provides a succession of first test pulses and a succession of second test pulses.

13. The apparatus of claim 11 wherein the pulse generating means includes:
means responsive to the command signal for generating a noise signal having a substantially zero d.c. component; and
means for superimposing the noise signal on the first and second test pulses.

14. The apparatus of claim 13 wherein the pulse generating means further includes means for varying the magnitude of the noise signal.

15. The apparatus according to claim 11 wherein the amplitude ratio of the first and second test pulses is selected relative to the energy scale of the pulse height analyzer such that the first test pulse corresponds to a channel location near the upper end of the scale and the second test pulse corresponds to a channel location near the lower end of the scale.

16. The apparatus according to claim 12 wherein:
the channel location determining means comprises means for computing the centroids of the peaks corresponding to the first and second test pulses; and
the ratio forming means is operative to form the ratio of the peak centroids.

17. A method for controlling over a certain temperature range offsets in the energy-channel relationship of the pulse height analyzer of a logging system of the type including a radiation detector, which generates electrical pulses having amplitudes representative of the energies of radiations incident thereon, and a pulse height analyzer for sorting the detector pulses into a plurality of channels according to the energies of the corresponding radiations, comprising the steps of:
generating a command signal;
generating in response to the command signal a first test pulse and a second test pulse of lower amplitude than the first pulse in a manner such that the ratio of the amplitudes of the first and second test pulses is maintained substantially constant over said temperature range;
applying the first and second test pulses to the pulse height analyzer;
determining the respective channel locations to which the first and second test pulses are assigned by the pulse height analyzer;
forming the ratio of the respective channel locations;
comparing the channel locations ratio and the ratio of the test pulse amplitudes;
generating a control signal representative of the difference between the channel locations ratio and the test pulse amplitude ratio; and
adjusting the energy-channel offset of the pulse height analyzer in response to the control signal in a manner to bring the channel locations ratio and the test pulse ratio into substantial agreement.

18. The method of claim 17 further comprising:
repetitively generating command signals at a predetermined frequency; and
alternately selecting between first test pulses and second test pulses for application to the pulse height analyzer, the frequency of said alternate selection being less than the frequency of generation of command signals, whereby a succession of first test pulses and a succession of second test pulses are alternatively provided.

19. The method of claim 17 wherein the pulse generating step further comprises:
generating in response to the command signal a noise signal having a substantially zero d.c. component; and
superimposing the noise signal on the first and second test pulses.

20. The method of claim 19 wherein the pulse generating step further comprises varying the magnitude of the noise signal as a function of the desired spreading of the pulse height analyzer peaks corresponding to the first and second test pulses.

21. The method of claim 17 wherein the amplitude ratio of the first and second test pulses is selected relative to the energy scale of the pulse height analyzer such that the first test pulse corresponds to a channel location near the upper end of the scale and the second test pulse corresponds to a channel location near the lower end of the scale.

22. The method of claim 18 wherein:
the channel location determining step comprises computing the centroids of the peaks corresponding to the first and second test pulses; and
the ratio forming step comprises forming the ratio of the peak centroids.

23. The method of claim 17 wherein the pulse height analyzer is located downhole and wherein command signals are generated repetitively during the course of a logging run, whereby offsets in the energy-channel relationship are detected and controlled during logging.

* * * * *